US009154935B2

(12) United States Patent
Jing et al.

(10) Patent No.: US 9,154,935 B2
(45) Date of Patent: *Oct. 6, 2015

(54) WIRELESS HOME MESH NETWORK BRIDGING ADAPTOR

(71) Applicants: SONY CORPORATION, Tokyo (JP); SONY ELECTRONICS INC., Park Ridge, NJ (US)

(72) Inventors: Xiangpeng Jing, Scotch Plains, NJ (US); Abhishek P. Patil, San Diego, CA (US); Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,036

(22) Filed: Oct. 6, 2014

(65) Prior Publication Data

US 2015/0023212 A1 Jan. 22, 2015

Related U.S. Application Data

(63) Continuation of application No. 12/367,184, filed on Feb. 6, 2009, now Pat. No. 8,964,634.

(51) Int. Cl.
| | |
|---|---|
| *H04W 4/00* | (2009.01) |
| *H04W 8/00* | (2009.01) |
| *H04L 12/28* | (2006.01) |
| *H04L 29/06* | (2006.01) |
| *H04W 16/18* | (2009.01) |
| *H04W 48/02* | (2009.01) |

(Continued)

(52) U.S. Cl.
CPC ........... *H04W 8/005* (2013.01); *H04L 12/2832* (2013.01); *H04L 63/06* (2013.01); *H04L 63/10* (2013.01); *H04W 16/18* (2013.01); *H04W 48/02* (2013.01); *H04W 84/18* (2013.01); *H04W 88/08* (2013.01); *H04W 88/16* (2013.01)

(58) Field of Classification Search
CPC ..... H04L 12/2832; H04L 63/06; H04L 63/10; H04W 88/16; H04W 8/005; H04W 16/18; H04W 48/02; H04W 84/18; H04W 88/08
USPC ......... 370/310, 328, 329, 331, 338, 351, 389, 370/400, 401; 709/227
See application file for complete search history.

(56) References Cited

U.S. PATENT DOCUMENTS

| | | | | |
|---|---|---|---|---|
| 6,842,460 B1 * | 1/2005 | Olkkonen et al. | ............ | 370/465 |
| 7,099,295 B1 * | 8/2006 | Doyle et al. | .................. | 370/338 |

(Continued)

*Primary Examiner* — Chi H Pham
*Assistant Examiner* — Robert Lopata
(74) *Attorney, Agent, or Firm* — John L. Rogitz

(57) ABSTRACT

A network bridging adaptor and method for enabling nodes to access a multi-tier wireless home mesh network is described. The network bridging adaptor is adapted to operate in an ad hoc network having access restricted to only wireless nodes that are provided from a common entity. According to one embodiment of the invention, the network bridging adaptor comprises a housing; one or more ports positioned along a side of the housing to receive data from an electronic device; a first radio logic unit contained within the housing and adapted to transmit and receive messages in order to detect a presence of the ad hoc network; and a second radio logic unit contained within the housing and adapted to operate as an access point by establishing communications with nodes that are provided by an entity different than the common entity. Other embodiments are described and claimed.

14 Claims, 6 Drawing Sheets

(51) Int. Cl.
  *H04W 84/18* (2009.01)
  *H04W 88/08* (2009.01)
  *H04W 88/16* (2009.01)

(56) References Cited

U.S. PATENT DOCUMENTS

| | | | | |
|---|---|---|---|---|
| 7,324,488 | B1 * | 1/2008 | Rubinstein et al. | 370/338 |
| 7,539,175 | B2 * | 5/2009 | White et al. | 370/350 |
| 7,581,095 | B2 * | 8/2009 | Billhartz | 713/168 |
| 7,792,050 | B2 * | 9/2010 | Metke et al. | 370/252 |
| 7,882,356 | B2 * | 2/2011 | Klemets et al. | 713/172 |
| 7,936,734 | B2 * | 5/2011 | Toledano et al. | 370/338 |
| 7,961,674 | B2 * | 6/2011 | Jing et al. | 370/328 |
| 8,134,986 | B2 * | 3/2012 | Sakai | 370/338 |
| 8,576,846 | B2 * | 11/2013 | Kumar et al. | 370/392 |
| 2004/0233855 | A1 * | 11/2004 | Gutierrez et al. | 370/252 |
| 2004/0235468 | A1 * | 11/2004 | Luebke et al. | 455/426.1 |
| 2005/0002354 | A1 * | 1/2005 | Kelly et al. | 370/329 |
| 2005/0201393 | A1 * | 9/2005 | Hatayama et al. | 370/401 |
| 2006/0215673 | A1 * | 9/2006 | Olvera-Hernandez | 370/406 |
| 2007/0053342 | A1 * | 3/2007 | Sierecki et al. | 370/351 |
| 2007/0081543 | A1 * | 4/2007 | Brenes et al. | 370/401 |
| 2007/0139188 | A1 * | 6/2007 | Ollis et al. | 340/539.12 |
| 2007/0274327 | A1 * | 11/2007 | Kaarela et al. | 370/401 |
| 2008/0112363 | A1 * | 5/2008 | Rahman et al. | 370/331 |
| 2008/0170549 | A1 * | 7/2008 | Everson et al. | 370/338 |
| 2009/0046677 | A1 * | 2/2009 | Toledano et al. | 370/338 |
| 2009/0213824 | A1 * | 8/2009 | Chen | 370/338 |
| 2010/0046443 | A1 * | 2/2010 | Jia et al. | 370/329 |
| 2010/0080200 | A1 * | 4/2010 | Stewart | 370/338 |
| 2010/0283579 | A1 * | 11/2010 | Kraus et al. | 340/5.7 |
| 2013/0203378 | A1 * | 8/2013 | Vos et al. | 455/406 |

* cited by examiner

WIRELESS HOME MESH NETWORK BRIDGING ADAPTOR

FIELD

The invention relates generally to the field of wireless device connectivity. More particularly, one or more of the embodiments of the invention relate to a method and apparatus for operating in (i) a first mode and appearing as a wireless mesh node during communications with a wireless home mesh network with restricted access, and/or (ii) a second mode and further appearing as an access point for other wireless non-mesh nodes so that non-mesh nodes can join the wireless home mesh network.

BACKGROUND

A wireless network can provide a flexible data communication system that can either replace or extend a wired network. Using radio frequency (RF) technology, wireless networks transmit and receive data over die air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications. The ad hoc mode also allows users to spontaneously form a wireless LAN. For example, a group of employees with laptops implemented with IEEE 802.11 wireless chipsets may gather at a coffee house and form a small WLAN by switching their NICs to ad hoc mode. As a result, the employees could share presentation charts and spreadsheets without the need for cabling or an AP.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without an infrastructure (e.g., an AP), and these devices can be mobile or stationary. Related to mesh networks, mobile ad-hoc networks (MANETs) are self-configuring networks of mobile routers, where the routers are free to relocate.

One of the primary advantages of mesh networks (and MANETs) is their ability to extend the range of the wireless network. For example, a user on one side of the building can send a packet destined to another user on the far side of the facility, well beyond the point-to-point range of IEEE 802.11-compliant AP, by having the radio signal hop from one mobile device to mobile device until the radio signal gets to its targeted destination. This can extend the range of the WLAN from hundreds of feet to miles, depending on the concentration of wireless users.

With recent technology advances in integrated circuits, and breakthroughs in multiple input and multiple output (MIMO) systems, wireless digital communications have entered a new era mat allows faster speed for wireless networking applications. Mobile devices such as smart phones, music/movie players, personal digital assistants, gaming devices and the like, are creating a demand for new wireless communication and networking technologies to allow seamless connection of wireless mobile devices within a home network that not only support high-bandwidth demanding applications such as high-definition (HD) videos, but also relies on manufacturer compatibility between the wireless devices to mitigate interloper and rogue network activity. As a result, there is a need for a network bridging adaptor that enables wireless and wired devices that are not provided or endorsed by a particular manufacturer to join a wireless home mesh network that is formed using proprietary information for that particular manufacturer.

BRIEF DESCRIPTION OF THE DRAWINGS

The present invention is illustrated by way of example, and not by way of limitation, in the figures of fee accompanying drawings and in which.

DETAILED DESCRIPTION

Figure 1:
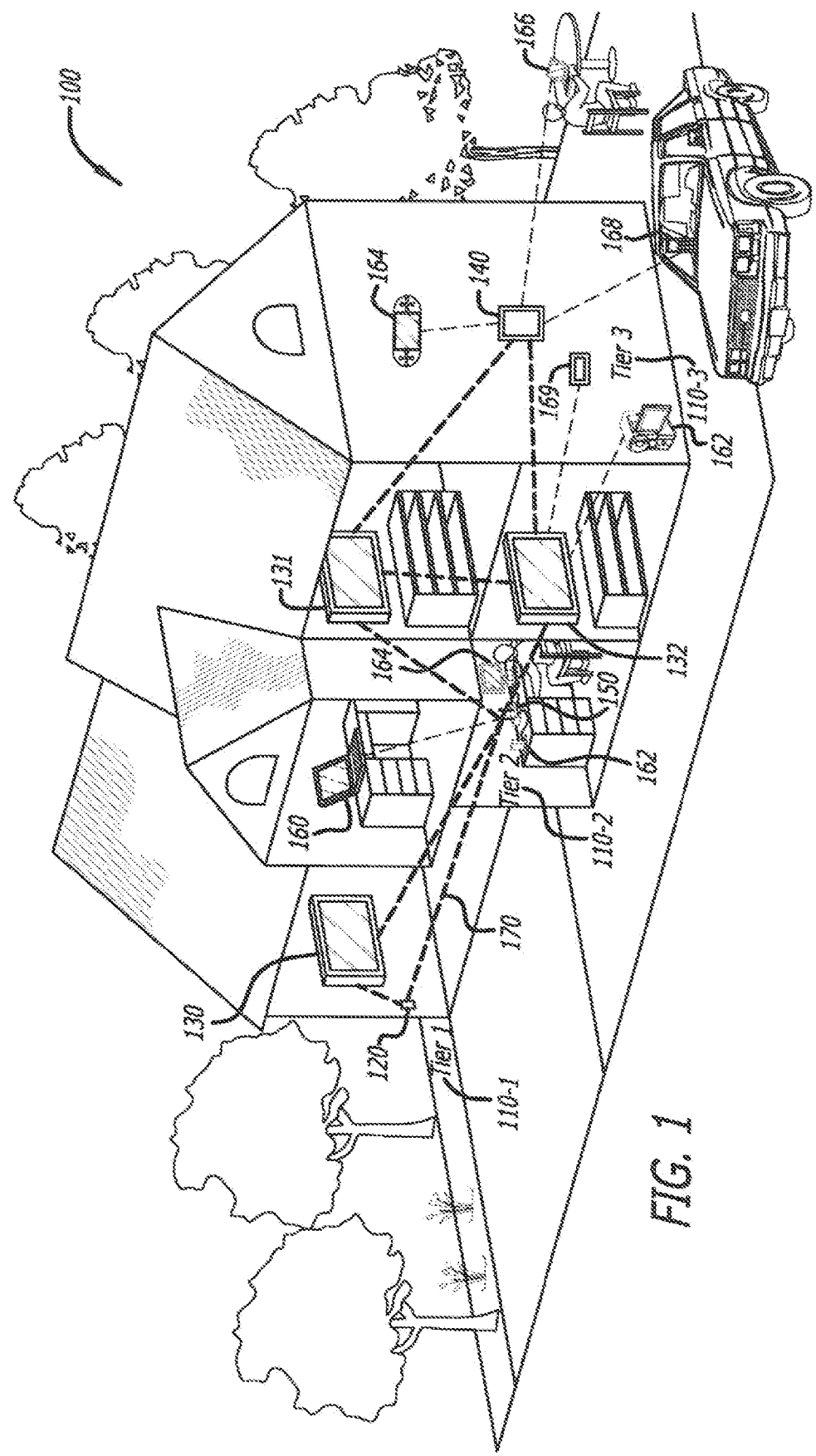
FIG. 1 is a block diagram illustrating an embodiment of a three-tier wireless ad hoc home mesh network (WHMN).

In the following description, for fire purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well known structures and devices are shown in block diagram form in order to avoid obscuring the details of the disclosed features of various described embodiments.

System Architecture

In the following description, certain terminology is used to describe certain features of the invention. For instance, the term "node" is generally defined as an electronic device with data processing capability and a "wireless node" is an electronic device with data processing and wireless communication capabilities. An ad hoc network may be formulated as "OEM-specific," meaning that, access is restricted to those wireless nodes that are manufactured and/or endorsed and/or sold by the same entity or a group of entities. For instance, an example of an OEM-specific WHMN is a network that comprises Sony® BRAVIA® digital television in communications with a Sony® Playstation 3® game console, a Sony® VAIO® computer, a Sony® handheld device, or a Sony® mesh network bridging adaptor.

Herein, there are two general types of nodes. A first type is a "mesh node" that is specifically adapted to join and become a member of an OEM-specific ad hoc network such as a wireless home mesh network (WHMN). An example of a mesh node includes a mesh network bridging adaptor as described below. The second type is a "non-mesh node" that is only able gain access to an OEM-specific WHMN indirectly through a mesh node. Such access may be through wireless or wired communications.

The term "logic" (or "logic unit") is generally defined as hardware and/or software configured to perform one or more functions. One example of a certain type of logic is a radio network interface card (NIC) that features a wireless chipset being one or more integrated circuits operating to transmit and/or receive signals in order to access a wireless network and/or authenticate a wireless node before granting access to the wireless network. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images, data files, or any combination thereof.

Referring to FIG. 1, an exemplary embodiment of a multi-tier wireless home mesh network 100 is described. Multi-tier wireless home mesh network (hereinafter referred to as "WHMN" or "WHM network") 100 comprises a collection of nodes that operate as a decentralized, wireless home mesh network with multiple (N≥1) sub-networks $110_1$-$110_N$ (hereinafter singularly referred to as "tiers"). Mostly every node of WHM network 100 is configured to forward data to other nodes and is assigned to a specific tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of WHM network 100 features a hierarchical architecture comprising three (3) tiers that are assigned based on the capabilities of the OEM-specific node. A first tier ("tier 1") $110_1$ is responsible for establishing and controlling access to an external network such as the internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless rooter or bridge, and the like. Although not shown, multiple gateway nodes may be present within WHM network 100 in order to provide multiple communication paths to external network(s).

A second tier ("tier 2") $110_2$ of WHMN network 100 may represent a wireless network backhaul that interconnects various stationary (fixed-location) OEM-specific wireless nodes adapted for communicating over a wireless communication medium such as, for example, radio frequency (RF) waves. As described herein, a "stationary wireless node" includes, but is not limited or restricted to: a flat-panel television 130, 131, and 132, a gaming console 140, a mesh network bridging adaptor 150, or arty other wireless device that is usually stationary and is electrically coupled to an AC power outlet. Hence, stationary wireless nodes are not subject to power constraints that are usually present in mobile nodes where power usage is minimized to extend battery life between recharges.

As shown, mesh network bridging adaptor 150 operates in dual mode simultaneously. As a wireless mesh node, it can wirelessly communicate with other mesh nodes using the appropriate mesh protocol, and be configured by users to join one existing WHMN. As a non-mesh node, it can communicate with wireless non-mesh nodes with Ethernet and/or WiFi network cards that are produced by a different manufacturer, to allow them accessing WHM network 100 using the standard IEEE 802.11 or Ethernet protocol. Effectively, it enables a non-mesh node access to contents and resources on WHM network 100. For instance, laptop computer 160 may use its WiFi radio (IEEE 802.11a/b/g/n) to associate with mesh network bridging adaptor 150 and effectively access WHM network 100. This is accomplished by laptop computer 160 associating to the adaptor's wireless SSID (where adaptor 150 appears to be an Access Point "AP" for the non-mesh nodes). Also, mesh network bridging adaptor 150 allows the wired non-mesh nodes to associate with and join WHM network 100. More specifically, wired non-mesh nodes (e.g., digital camera 162 or desktop computer 164) can connect to adaptor 150 by using a standard Ethernet cable. In both cases, such connectivity may be accomplished without any additional hardware or software modification.

Mesh network bridging adaptor 150 hosts a web interface which allows each connected son-mesh node 160-164 to enter authentication information such as a mesh password when it first accesses WHM network 100. Non-mesh nodes 160-164 also can be authenticated to access WHM network 100 using the authentication scheme described in FIG. 7 or use of a valid mesh certificate which has an expiration date to prevent unlimited access. Non-mesh nodes 160-164 are implemented with any operating system which has the ability to access the web interface hosted by adaptor 150 using a web browser. The web interface can provide network administrators with other options such as to limit the access rights to certain mesh nodes or contents for certain non-mesh nodes (e.g., a guest).

Referring still to FIG. 1, a third tier ("tier 3") $110_3$ of WHM network 100 may include links between a wireless node belonging to second tier $110_2$ and one of more mobile nodes (170, 172, 174, 176 & 178). A "mobile node" may include any battery powered electronics device with wireless connectivity including, but is not limited or restricted to a laptop computer, handheld device (e.g., personal digital assistant, ultra mobile device, cellular phone, portable media player, wireless camera, remote control, etc.) or any non-stationary consumer electronics devices. Since mobile nodes normally have resource constraints (e.g., limited power supplies, limited processing speeds, limited memory, etc.), third tier $110_3$ may provide reduced network services, in one embodiment, mobile nodes of WHM network 100 may act as a slave or child connecting directly to a tier-2 node, which may further limit their functionality within WHM network 100.

Since the traffic on backhaul 180 may include high-definition (HD) video, audio clips and video clips, as well as user data, radio NICs may be incorporated within some of the stationary nodes of the WHM network 100. For example, by multiplexing a flow of compressed HD video, multiple Internet video sessions, multiple audio/video sessions and some intermittent http data traffic, the load on backhaul link 180 could reach approximately 60 megabits per second for TCP/UDP type traffic, which may require at least 100 megabits per second of raw radio support considering media access control (MAC) layer efficiency. According to this example, rite tier-2 nodes might require an 802.11n type radio (e.g., at 5 GHz band) to meet such bandwidth requirements.

Figure 2:
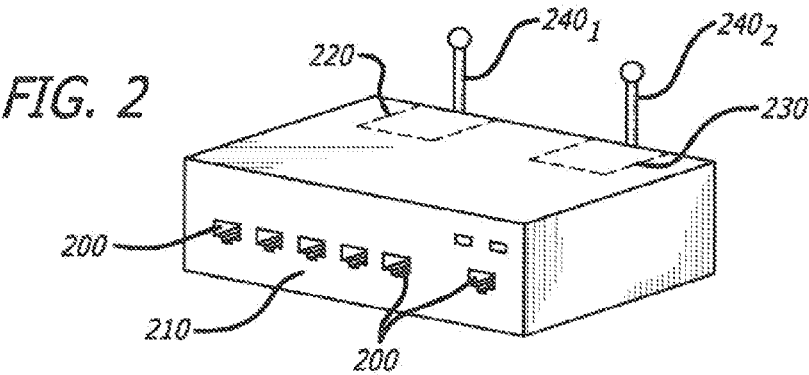
FIG. 2 is a block diagram illustrating an embodiment of a tier-2 node within a WHMN.

Referring now to FIG. 2, an exemplary embodiment of tier-2 node 150 is shown. Herein, tier-2 node 150 is a mesh network bridging adaptor that includes one or more ports 200 positioned on a side of housing 210. Ports 200 are adapted to receive a connector from a wired non-mesh node. For instance, as an example, ports 200 are gigabit Ethernet ports that are adapted to receive one or more Ethernet connectors associated with corresponding wired non-mesh node(s).

Mesh network bridging adaptor 150 comprises a first radio logic unit 220 and a second radio logic unit 230. According to one embodiment of the invention, each of the first and second radio logic units 220 and 230 comprises either a single-band or a dual-band WiFi radio which operates on different channels from each other to avoid interference. First radio logic unit 220 and second radio logic unit 230 receive/transmit messages via antennas $240_1$ and $240_2$, respectively. Herein, first logic unit 220 enables adaptor 150 to operate in an ad hoc mode and establish communications with ad hoc networks while second logic unit 230 enables adaptor 150 to operate in as infrastructure mode to establish communications with wireless nodes scanning to associate with an access point.

More specifically, operating in a "mesh" mode where tire first radio logic unit 220 is in operation, adaptor 150 appears to be a wireless mesh node operating in an ad hoc mode that can join WHM network 100 of FIG. 1 or start a new mesh network. During this mode, wired (non-mesh) nodes connected to ports 200 may be provided access to WHM network 100. Similarly, when adaptor 150 is operating in a "hybrid" mode, where both first and second radio logic units 220 and 230 are in operation, second radio logic unit 230 operates in infrastructure mode and appears to be an access point for all wireless non-mesh nodes equipped with standard WiFi in its signaling range. Thus, these wireless non-mesh nodes may be able to gain access to WHM network 100. However, when adaptor 150 is in a third mode where first radio logic unit 220 is not in operation, the wireless non-mesh nodes have access to resources available to the wired non-mesh nodes coupled to posts 200 of adaptor 150 or resources on a wired network to which adaptor 150 is coupled. No access to WHM network 100 of FIG. 1 is available.

Referring back to FIG. 1, operating in the mesh or hybrid mode, adaptor 150 associates with another node (e.g., node 130) that is already part of WHM network 100. After an association is established, adaptor 150 and tier-2 node 130 can exchange data. The association process is a two step process involving three states: (1) unauthenticated and unassociated; (2) authenticated and unassociated; and (3) authenticated and associated. To transition between the states, the communicating parties exchange messages called management frames (or control messages). In operation, all nodes are adapted to transmit one or more management frames, referred to as a "Neighbor Discovery Request" message, to determine if there are any nodes that can decode the message and respond in a timely manner.

Before conducting operations to associate (join) WHM network 100, adaptor 150 listens for response messages to a Neighbor Discovery message in order to identify what other nodes are within range and in communication over what channel. After identifying adaptor 150, node 130 may communicate with this node and perform a mutual authentication by exchanging several management messages. After successful authentication as described is FIG. 7A, adaptor 150 moves into the second state-authenticated and unassociated.

Figure 3:
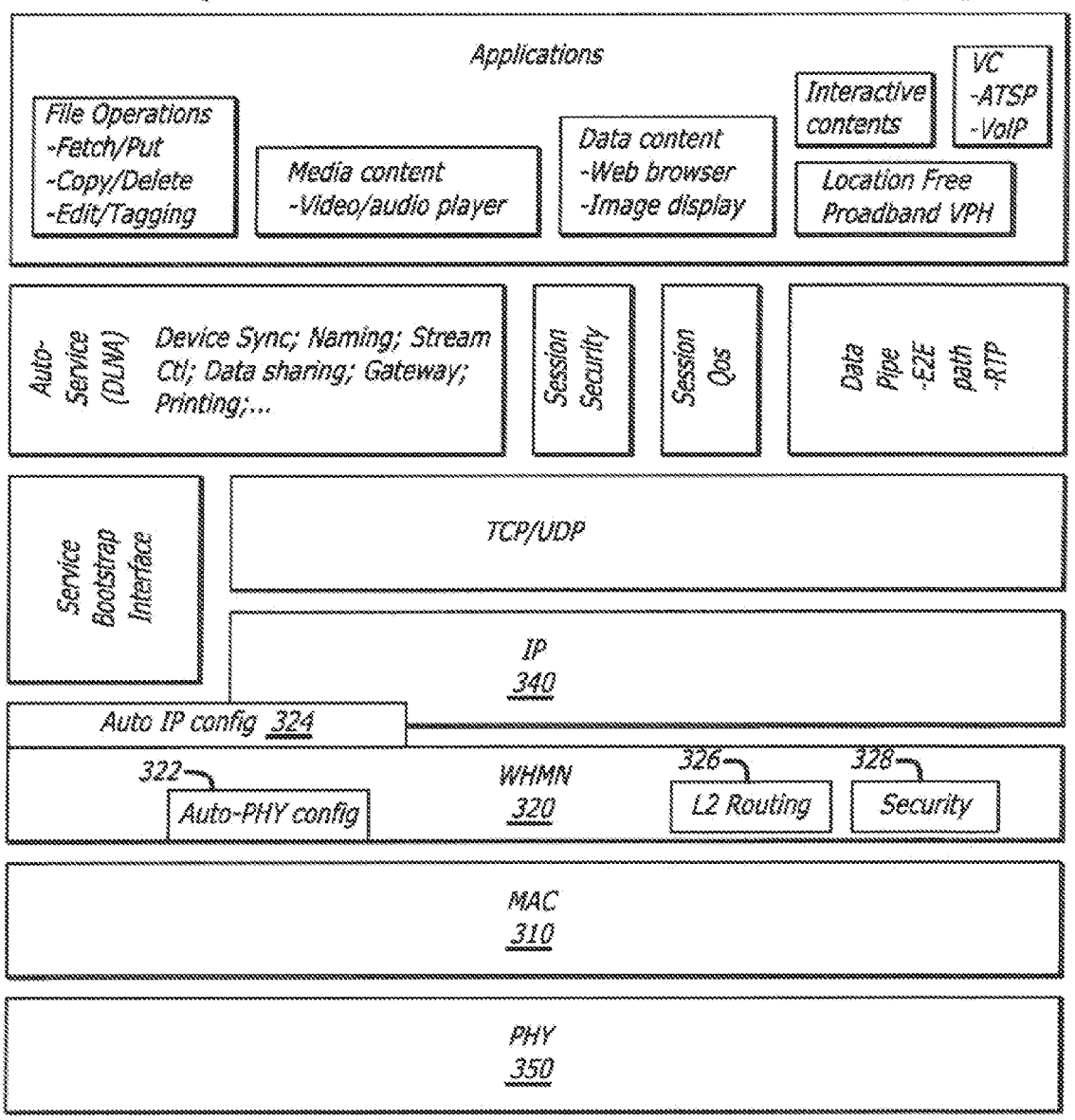
FIG. 3 is a block diagram illustrating an embodiment of a wireless home mesh network protocol architecture.

Referring now to FIG. 3, a block diagram shows one embodiment of an Open Systems Interconnection (OSI) layer representation of the system protocol architecture 300 for first radio logic unit 220 of network bridging adaptor 150 within WHM network 100. To enable wireless home mesh network functions, a dual WiFi radio platform may be used. For example, two IEEE 802.11a/b/g/n, dual-band cards (mini PCI, USB dongle, or the like), where one of the dual-band cards is used for mesh backhaul links to operate at a 5 GHz band or higher bandwidth. In one embodiment of the invention, links connecting tier-3 nodes are compatible with legacy 802.11b/g mode simply because, at this time, most current mobile nodes support IEEE 802.11b/g WiFi. Of course, the particular PHY layer 350 supports both wireless and wired communications.

As shown in FIG. 3, in the protocol architecture 300 described, wireless home mesh network ("WHMN") functions 320 are placed between MAC layer 310 and network (IP) layer 340 to provide a solution that is independent of the higher OSI layers deployed and cart be more easily reconfigured. Representatively, in system protocol architecture 300 of FIG. 3, enhanced functionality is placed in WHMN layer 320 between MAC layer 310 and a Network (IP) layer 340. Hence, WHMN layer 320 generally constitutes an "OSI layer 2.5" solution. The placement of WHMN layer 320 provides enhanced functionality that is transparent to both lower and higher OSI layers, and different radio chipsets can be supported.

In one embodiment, WHMN layer 320 can perform functions of WHMN software organization and configuration such as auto-PHY (secure network discovery) configuration 322, auto-IP addressing 324, layer two (L2) routing 326, security 328 such as node authentication and the like. In one embodiment, the auto-IP configuration function 324 may provide automated IP address generation once an electronic device has been authenticated and joined an identified WHMN.

Figure 4:
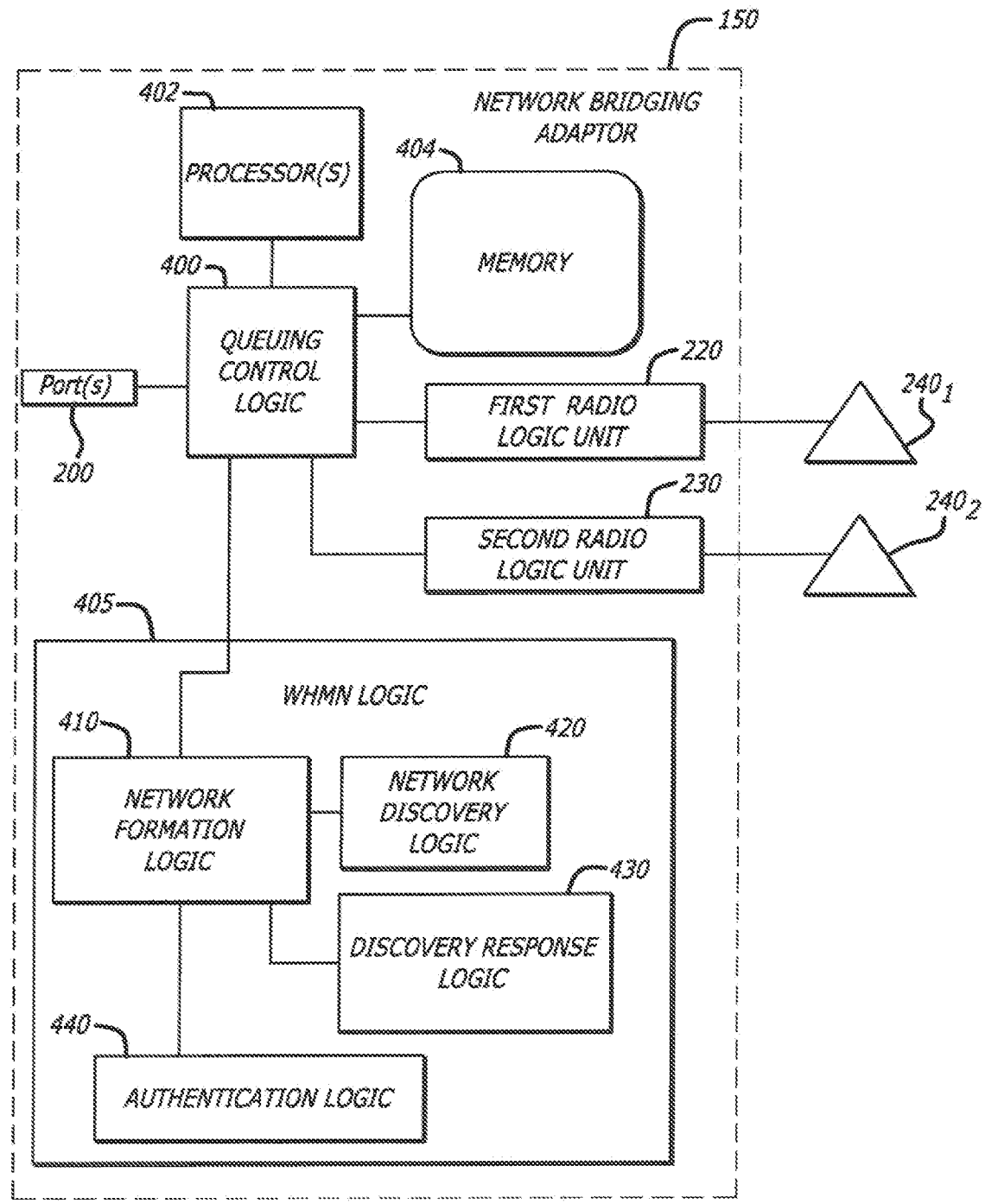
FIG. 4 is a block diagram illustrating an embodiment of a wireless home electronics device configured to implement a WHMN.

As illustrated in FIG. 4, an exemplary block diagram of network bridging adaptor 150 is shown. Adaptor 150 comprises queuing control logic 400 that is coupled to one or more processors 402 and may be adapted to control first radio logic unit 220 and second radio logic unit 230. Adaptor 150 operates on an embedded Linux® operating system stored in memory 404 where the mesh networking software is running, which forwards traffic between the Ethernet (ports 200), first radio logic unit 220 and second radio logic unit 230. In spite of the mesh functionalities, the second radio of adaptor 150 can also serve as a regular wireless internet router if uplinks are present. Adaptor 150 will host a web server which performs authentication functions when new non-mesh nodes first connect trod the adaptor is operating in the hybrid mode.

According to one embodiment of the invention, queuing control logic 400 is adapted to perform the message formatting for communications with WHM network 100 or in accordance with a network featuring wireless non-mesh nodes operating in accordance with any version of an IEEE 802.11 Standard. Herein, first radio logic unit 220 would be adapted to transmit and receive using antenna $240_1$ while second radio logic unit 230 would be adapted to transmit and receive using antenna $240_2$. Alternatively, processor(s) 402 in combination, with queuing control logic 400 may be adapted to control data flow and buffer information transmitted to or received, from first radio logic unit 220 and second radio logic unit 230. In addition, queuing control logic 400 is adapted to control the operations of the logic units, namely first radio logic unit 220 is adapted to perform the message formatting for communications with WHM network 100 and the tuning of antenna $240_1$ while second radio logic unit 230 is adapted to control message formatting for communications with the wireless non-mesh nodes and the tuning of antenna $240_2$.

In contrast to conventional electronics devices, adaptor 150 further includes wireless (ad hoc) home mesh network ("WHMN") logic 405. The WHMN logic 405 includes network formation logic 410, network discovery logic 420, discovery response logic 430 and authentication logic 440.

In one embodiment, when adaptor 150 is powered on, network discovery logic 420 may scan each, wireless channel to detect the presence of other networks operating as ad hoc networks. According to one embodiment of the invention, during its initial operation, adaptor 150 is configured by a network administrator (e.g., home owner or installer) to connect to a current mesh network by accessing the web interface in bridging adaptor 150. According to the IEEE 802.11 Standard, when first radio logic unit 220 operates in an ad hoc mode, beacons may be sent from adaptor 150 during the beacon period or may be transmitted from a neighboring wireless node. Regardless of the origination of the beacon, die various nodes utilize the beacons for synchronization and also to determine general location and perhaps particulars of the transmitting node.

The administrator configuration web interface can allow users to scan current available networks, where adaptor 150 may trigger network discovery logic 420 to perform one or more 802.11 "ad hoc" functions such as scanning each wireless channel to determine a list of available ad hoc networks. Based on the detected signals (e.g., beacons), network discovery logic 420 may identify one or more ad hoc networks. The network discovery logic 420 may transmit one or more security parameters to defect a WHM network from one or more identified wireless ad hoc networks. These security parameters are usually entered by the network administrator which may enable an existing node within the WHM network to verify adaptor 150 as an OEM-specific node, namely an electronics device from a same entity or group of entities mat form the WHM network. Discovery response logic 430 may respond appropriately when device 150 is a node of a WHM network. The authentication process, as shown in FIG. 7, may be performed by authentication logic 440.

Referring again to FIG. 4, in one embodiment, if adaptor 150 does not detect the presence of a WHMN, tire administrator may choose to create a new mesh network using the network formation logic 410 which may enter a network initiator phase to establish adaptor 150 as either a mobile node or a stationary node for a WHMN. For example, referring again to FIG. 1, flat-panel television (TV) 130 may initially become a first stationary node for WHMN 100 of FIG. 1. According to such an embodiment, TV 130 will include a radio NIC which will periodically emit a beacon to enable identification of WHMN 100 by any newly-added electronics devices. For example, adaptor 150, upon activation, may detect the presence of WHMN 100 based on a response received from TV 130 in response to a connection request message, which is organized based on a proprietary format as shown in FIG. 5.

System Functionality

Figure 5:
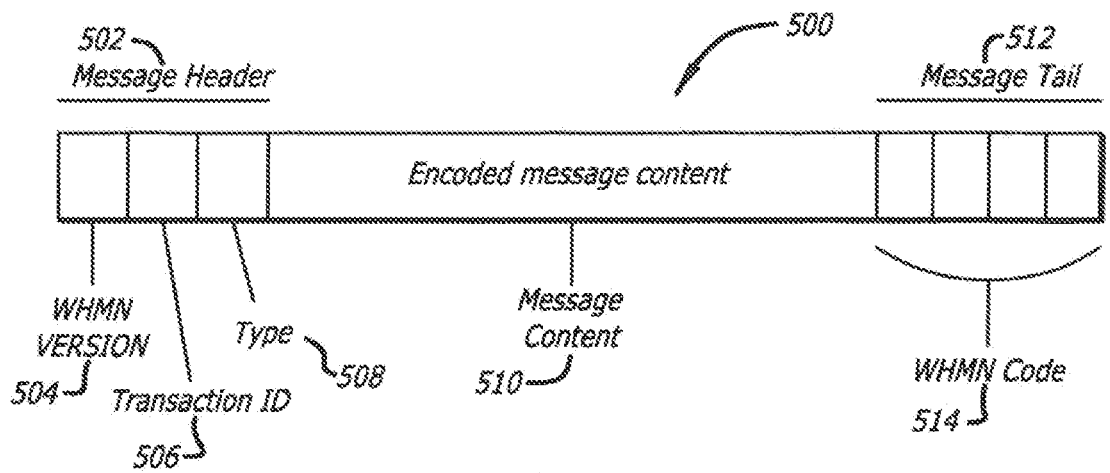
FIG. 5 illustrates a generic WHMN message packet format according to one embodiment of the invention.

FIG. 5 illustrates an exemplary format of a WHMN message 500, which is representative of a messaging format that network bridging adaptor 150 of FIG. 4 uses for initial WHMN setup. For example, during a discovery phase where nodes analyse their wireless environment, each, new wireless node may run a network scan (using standard 802.11 functions) to find all wireless networks in its neighborhood. The new node then transmits a message as a broadcast or multicast to all identified WHM networks in an attempt to identify a WHMN in its neighborhood. Existing nodes of a WHMN respond to the Discovery message with appropriate details necessary to establish a new connection.

More specifically, as shown in FIG. 5 as an illustrative embodiment, WHMN message 500 may include (i) a message header 502, (ii) message content 510, and (iii) a message tail 512. Herein, according to this exemplary embodiment, message header 502 includes a WHMN version 504, a transaction (message) ID 506 that identifies the particular message, a type parameter 508 indicates a type of node transmuting the message (e.g., tier 1, tier 2 or tier 3). Message content 510 may include encoded data that is used to protect the data from interlopers and to ensure that the data is accessible only by the targeted wireless node. Message tail 512 includes a WHMN code 514. In one embodiment of the invention, each WHMN message ends with a WHMN code 514 that may be repeated a predetermined number of times to ensure that an entire message is received without error.

Figure 6:
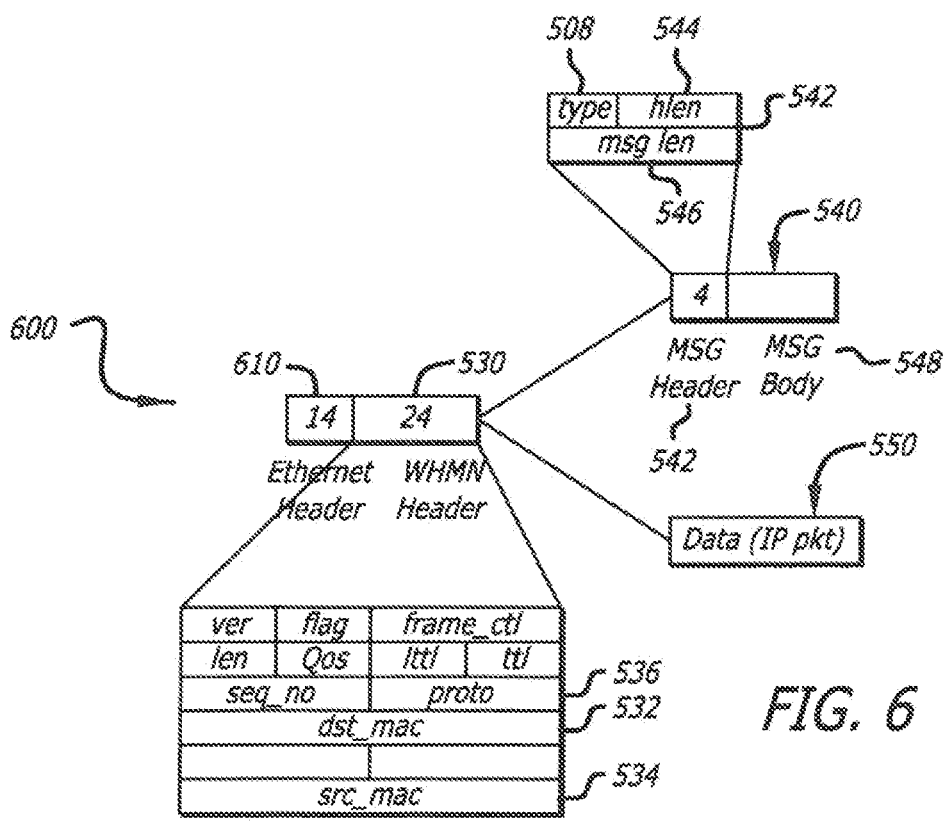
FIG. 6 illustrates an embodiment of an implementation (using Ethernet packet) of a generic WHMN message packet format according to one embodiment.

As an example, FIG. 6 illustrates exemplary formats of two types of WHMN message 500, namely WHMN data messages 550 and WHMN control messages 540. Herein, according to this embodiment of the invention, both WHMN data message 550 and WHMN control message 540 are routed by encapsulating these messages within as Ethernet packet 600 that includes a 24-byte WHMN header 530 inserted after an Ethernet header 610. WHMN Header 530 includes a destination MAC address (dst_mac) 532 to identify a destination for WHMN message 500 and a source MAC (src_mac) address 534 to identify a source of WHMN message 500. Other information 536 also may be placed within header 530 including, but not limited to a protocol version number that identifies a version of the system protocol architecture, a control flag, a frame type as being data or control, a frame length, a QoS feature, a Time-to-live (TTL) value that specifies how long (in hops) the message is allowed to "live" on the network where each hop causes the TTL value to be reduced by one, a sequence number that indicates the sequence of the frame within a complete message transaction, and a data protocol type.

For WHMN control messages (e.g. Discovery, Authentication, etc.), 4-byte control header 542 is inserted after header 530, where control header 542 includes type 508 as well as header length 544 and message length 546. After control header 542, a message body (content) 548 of WHMN control message 540 is inserted. For Discovery messages, for instance, message body 548 is a "challenge text" as described below.

In contrast, for WHMN data messages 550, an IP data packet received from the OSI network layer is attached to Ethernet packet 600 after WHMN header 530 in lieu of control header 542 and message body 548.

Figure 7A:
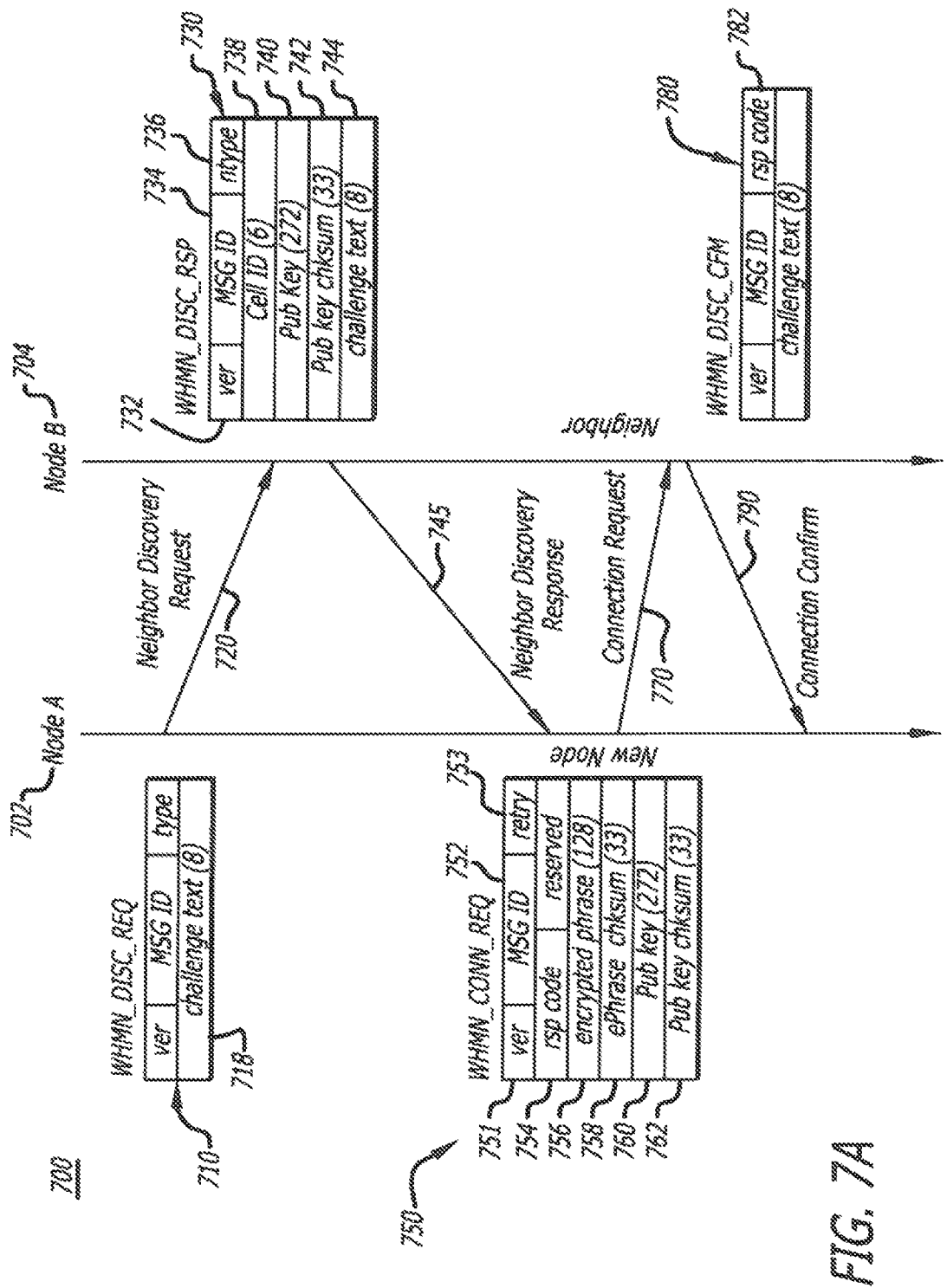
FIG. 7A illustrates an embodiment of a message flow diagram that focuses on the authentication and associate operation by the first radio unit to enable access to WHMN.
Figure 7B:
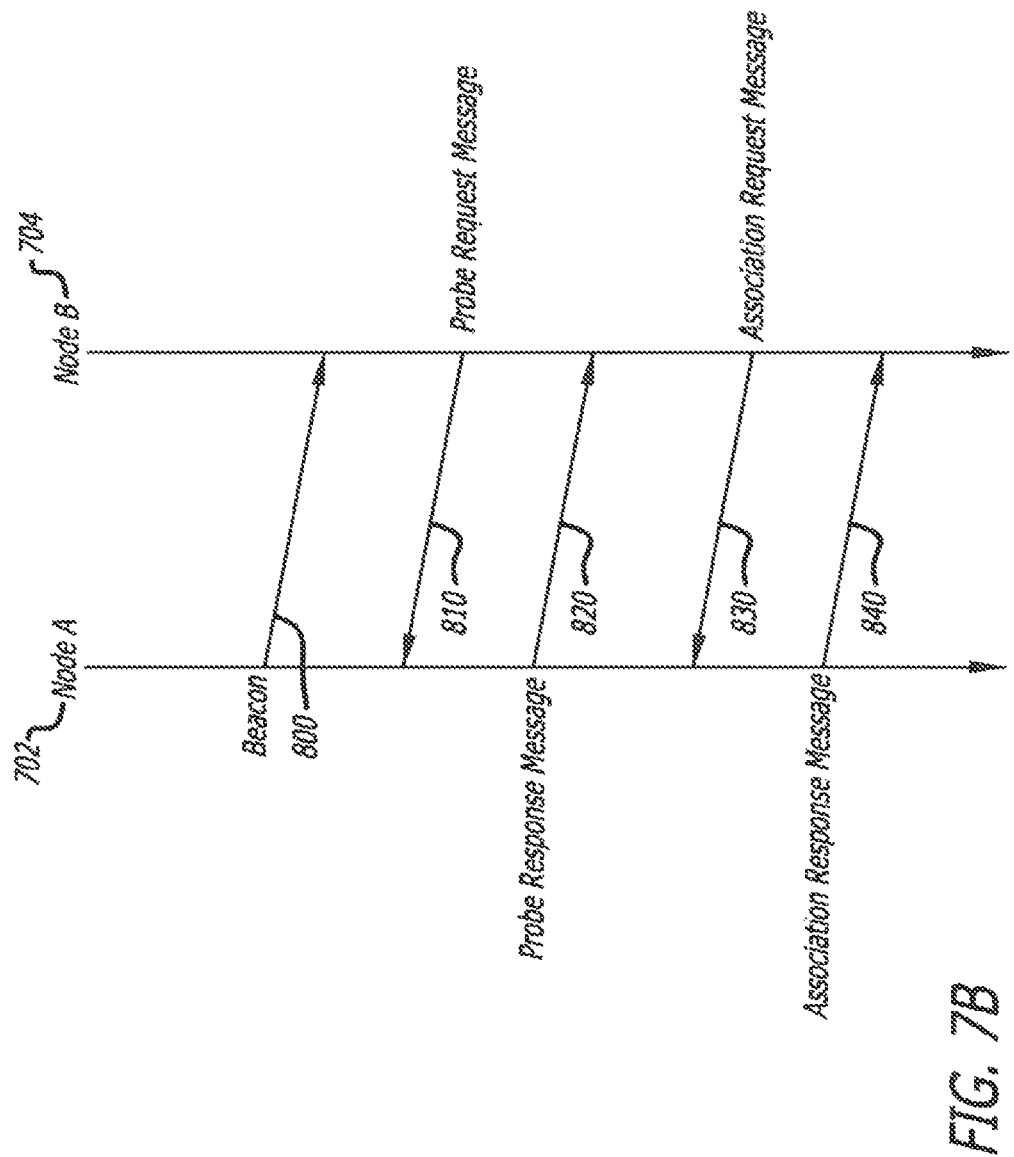
FIG. 7B illustrates an embodiment of a message flow diagram that focuses on authentication and association operations by the second logic radio unit. Together, they show how a wireless non-mesh node gets access to a WHMN.

FIGS. 7A and 7B illustrate one embodiment of a message flow diagram 700, performed by a wireless node, which is capable of: (1) joining a WHMN based on communications with a responding (existing) node of the WHMN and (2) establishing connectivity with one or more wireless non-mesh nodes. As shown in FIG. 7A, the wireless node, is referred to as "Node A" 702 and the responding wireless node is referred to as "Node B" 704, respectively. According to one embodiment of the invention, FIG. 7A illustrates Node A 702 (bridge adaptor) in communication with Node B 704 (another mesh node).

Herein, a message (WHMN Neighbor Discovery Request) 710 that a first radio logic unit of Node A 702 transmits to one or more detected wireless ad hoc networks. This transmission may be in a broadcast or multicast manner. The Neighbor Discovery Request message (WHMN_DISC_REQ) 710 is sent out in an attempt to rind an existing WHMN from the detected wireless ad hoc networks. Neighbor Discovery Request message 710 is proprietary to the WHMN and will be recognized by other OEM-specific wireless nodes in the neighborhood. In one embodiment, Neighbor Discovery Request message 710 may include a security field 712 to protect the WHMN from denial-of-service (DOS) attack from non-mesh nodes.

According to one embodiment of the invention. Neighbor Discovery Request message is a broadcast or multicast message that a node sends out in an attempt to find and join existing OEM-specific ad hoc networks. The Neighbor Discovery Request message includes security field 712 and a node type field 714. In general, security field 712 contains $2^k$-bits, where k≥5 (e.g., $2^6$ or 64-bits). These 8-byres are derived from a proprietary function that is utilized by a specific OEM, using a secret value (e.g., secret, logical value formed with alphanumeric characters and particular to an entity or group of entities) and extended service set identification (ESSID) of the network that Node A is trying to join. Node type field 714 includes a parameter that lets the receiving node (Node B) know about Node A's capabilities.

| | | |
|---|---|---|
| #define GATEWAY | 1 | /*node Type - GATEWAY*/ |
| #define STATIONARY | 2 | /*node type - Tier-2 Stationary (default)*/ |
| #define MOBILE | 3 | /*node type - Tier-3 Mobile*/ |

In the event that the content within security field 712 does not match the expected result at the receiving node, the Neighbor Discovery Request message is nor processed further so that no response is generated. However, if a match is detected, the receiving node (Node B) associated with site WHM network transmits a Neighbor Discovery Response message to Node A.

More specifically, according to one embodiment of the invention, security field 712 includes a challenge text, namely a secret value combined with the current timestamp, an ESSID and cell ID of a network that Node A 702 is attempting to join. The "combination" may be implemented as one or more Exclusive OR (XOR) operations, a concatenation, hash, or any arithmetic or logical operation on the data forming the secret text. The secret value may be persistently stored within memory or ROM of Node A 702, or may be generated based upon a proprietary seed value that is utilized by the particular OEM. Upon scanning wireless channels and upon detecting Neighbor Discovery Request message (see arrow 720). Node B 704 may verify that the challenge text 712 matches an expected value. Presuming challenge text 712 is verified to identify Node A 702 as an OEM-specific wireless mesh node, Node B 704 will generate a Neighbor Discovery response (WHMN_DISC_RSP) 730 and initiate a outcast transmission to Node A 702.

As further shown in FIG. 7A, Neighbor Discovery Response message 730 may include a version number of mesh software 732; a message identifier e.g., response) 734; a type identifier 736 to identity the tier level of Node B 704; a node identifier (cell ID) 738; a public key 740 of Node B; a checksum 742 of public key 740 (public key checksum 742); and challenge text 744. Public key 740 is used in the connection phase. Public key checksum 742 is added to mitigate undetected corruption or tampering with public key 740, which is most likely need in a man-in-the-middle attack. Public key checksum 742 may be computed as a hash result computed by hashing public key 740 using MD-5 or another hashing function. Challenge text 744 is a combination of the MAC address of Node A and the secret value.

In one embodiment, receipt of the Neighbor Discovery Response message (see arrow 745) indicates to Node A 702 that a detected ad hoc network is identified as a WHMN. Node A 702 checks the integrity of the Neighbor Discovery Response message by comparing the received checksum wish the locally generated checksum for the received public key. Once the checksum is validated, Node A 702 may save various information regarding Node B 704 such as its public key, MAC address or the like. Node A 702 may repeat this process to identify multiple WHMNs, which may be presented to the user as a list, with a user selection required to join a desired network. Thereafter, the process now moves to the Authentication phase.

The bridge has to be authenticated to join a mesh network by using, for example, a user pass-phrase. This pass-phrase is encrypted using the Node B's public key and then is sent along with a checksum of the encrypted pass-phrase. Node A's public key and a checksum of Node A's public key within a Connection Request message. More specifically, Node A 702 generates a Connection Request message 750 (see arrow 770) for transmission to Node B 704. Connection Request message 750 provides version number 751, message identifier 752, retry value 753, response code 754 as defined above. Additionally, Connection Request message 750 provides information for authentication of Node A, including the encrypted pass-phrase 756, a checksum of the encrypted pass-phrase 758, a public key of Node A 760 and a checksum of this public key 762.

Upon receiving the Connection Request message, Node B 704 checks for integrity by examining the checksum values. Node B 704 then decrypts the encrypted pass-phrase and then checks for she integrity of the received public key by comparing the decrypted pass-phrase wife its pass-phrase. Thereafter, Node B 704 generates Connection Confirmation message 780 if the connection request is validated as described above with the response code to identify failure or success of such validation (see arrow 790). Connection Confirmation message 780 includes a response code 782 and a challenge test 785 that is present to prevent attacks where an erroneous (or fake) confirmation is sent. Since challenge text 785 is generated using as OEM-specific secret value (e.g., a logical value associated with the manufacturer), it will also serve to differentiate products generally provided or endorsed by the manufacturer and those products that are not.

Response code 782 of Connection Confirmation message 780 serves as a feedback to Node A 702 that its request has been received with success or failure. The following gives a list of error codes.

| #define CONN_SUCCESS | 0 |
| #define PASSCODE_FAILED | 1 |
| #define ENC_CHKSUM_ERR | 2 |
| #define PUBKEY_CHKSUM_ERR | 3 |
| #define UNKNOWN_ERR | 4 |

The timeout and retry values for connection authentication process may be set as follows to set wait times for Connection Confirmation messages 780 and the number of retries for such transmissions.

| #define TIMEOUT_CONN_REQ | 5 | /*5 seconds*/ |
| #define MAX_CONN_RETRY | 3 | |

Independent of the discovery and authentication operations described above, as shown in FIG. 7B, the second radio logic unit of Node A 702 (adaptor) attempts to announce itself as an access point using beacons and accept association request with wireless non-mesh nodes in the signaling vicinity of the adaptor. In particular, the second radio unit of Node A 702 receives messages from a wireless non-mesh node (e.g., Node B 704) to establish connectivity with Node A 702 operating as an access point and transmitting beacons 800. A "beacon" 800 is a message that announces the presence of Node A 702 (adaptor) and provides the SSID, and other parameters for wireless NICs within range. Beacon 800 carries information about its radio NIC including supported data rates and she SSID of fee network the wireless non-mesh node wishes to associate with. The messages to establish connectivity between Node A 702 and Node B 704 may include, but are not limited or restricted to a Probe Request 810, Probe Request 820, an Association Request 830 and an Association Response 840.

According to this embodiment of the invention, if Association Request message 830 is accepted, Node A 702 reserves memory, establishes an association ID for the radio NIC and transmits Association Response message 840 to Node B. Association Response message 840 contains an acceptance or rejection to Association Request message 830. For an acceptance, Association Response message 840 will contain information such an association ID and supported data rates.

Of course, in as alternative situation where Node A 702 is already associated with Node B 704, but such communications are disrupted for some reason, Node A 702 may re-establish association by transmission of Reassociation Request and Reassociation Response messaging (nor shown).

It is to be understood that even though numerous characteristics and advantages of various embodiments of the present invention have been set forth in the foregoing description, together with derails of the structure and function of various embodiments of the invention, this disclosure is illustrative only. Is some cases, certain subassemblies are only described in detail with, one such embodiment. Nevertheless, it is recognized and intended that such subassemblies may be used in other embodiments of the invention. Changes may be made in detail especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A network bridging adaptor adapted to operate in an ad hoc network having access restricted to only wireless nodes that are provided by a common entity, the network bridging adaptor comprising;
   at least one input configured to receive data from an electronic device;
   a first logic unit to transmit and receive messages to detect a presence of the ad hoc network, communication in the ad hoc network being encrypted at least in part using an original equipment manufacturer (OEM)-specific secret value of the common entity; and
   a second logic unit to operate as an access point to the ad hoc network by establishing communications with nodes that are provided by an entity different than the common entity,
   wherein nodes that are provided by the common entity comprise at least one of nodes that are manufactured by the common entity, nodes that are sold by the common entity.

2. The network bridging adaptor of claim 1, wherein both the first logic unit and the second logic unit include dual-band WiFi radios that operate on different channels from each other to avoid interference.

3. The network bridging adaptor of claim 1, wherein the first logic unit to transmit and receive messages via a first antenna and the second logic unit to transmit and receive messages via a second antenna.

4. The network bridging adaptor of claim 1, wherein the first logic unit includes a dual-band WiFi radio that operates on a different channels than the second logic unit to avoid interference.

5. The network bridging adaptor of claim 1, wherein both the first logic unit and the second logic unit include single-band WiFi radios that operate on different channels from each other to avoid interference.

6. The network bridging adaptor of claim 1, wherein the at least one input being is plurality of Ethernet ports.

7. A system comprising:
   a one or more wireless nodes that are provided by a common entity and form an ad hoc network having restricted access to nodes provided by the common entity, wherein nodes that are provided by the common entity comprise at least one of nodes that are manufactured by the common entity, and nodes that are sold by the common entity; and
   a network bridging adaptor including:
   at least one port configured to receive data from an electronic device,
   a first logic unit to transmit and receive messages in order to detect a presence of the ad hoc network, and
   a second logic unit to operate as an access point to the ad hoc network by establishing communications with nodes that are provided by an entity different than the common entity, the network bridging adaptor configured to employ a communication protocol in which a wireless home mesh network ("WHMN") layer is placed between a media access code (MAC) layer and a network (IP) layer to provide a protocol that is independent of higher open systems interconnection (OSI) in the protocol.

8. The system of claim 7, wherein both the first logic and and the second logic unit of the network bridging adaptor are dual-band WiFi radios that concurrently Operate on different channels from each other to avoid interference.

9. The system of claim 7, wherein the first logic unit of the network bridging adaptor is configured to transmit and receive messages via a first antenna and the second logic unit is configured to transmit and receive messages via a second antenna.

10. The system of claim 7, wherein the at least one input of the network bridging adaptor is a plurality of Ethernet ports.

11. The network bridging adaptor of claim 1, wherein the adaptor has a dual mode in which the logic units operate simultaneously with each other such that the adaptor communicates with both the ad hoc network and node not in the ad hoc network substantially simultaneously.

12. The adaptor of claim 11, wherein in the dual mode the adaptor operates as a wireless mesh node to wirelessly communicate with other mesh nodes using an appropriate mesh protocol, and also operates as a non-mesh node to communicate with wireless non-mesh nodes with communication interfaces that are produced by an entity different from the common entity such that a non-mesh node can access information on the ad hoc network without knowing the secret value of the common entity.

13. The adaptor of claim 11, wherein the adaptor has a "mesh" mode in which only the first logic unit is in operation, such that the adaptor appears to be a wireless mesh node operating in an ad hoc mode that can join the ad hoe network or start a new mesh network.

14. The adaptor of claim 11, wherein in the adaptor has a third mode in which the first logic unit is not in operation and wireless non-mesh nodes have access to resources available to the wired non-mesh nodes coupled to the adaptor, but do not have access to the ad hoc network.

* * * * *